United States Patent
Walsh et al.

(10) Patent No.: US 9,832,487 B2
(45) Date of Patent: Nov. 28, 2017

(54) MODEL-BASED SCAN LINE ENCODER

(71) Applicant: LEICA GEOSYSTEMS AG, Heerbrugg (CH)

(72) Inventors: Gregory Charles Walsh, Walnut Creek, CA (US); Christopher Thewalt, Walnut Creek, CA (US)

(73) Assignee: LEICA GEOSYSTEMS, AG, Heerbrugg (CH)

(*) Notice: Subject to any disclaimer, the term of this patent is extended or adjusted under 35 U.S.C. 154(b) by 509 days.

(21) Appl. No.: 14/066,493

(22) Filed: Oct. 29, 2013

(65) Prior Publication Data

US 2014/0334554 A1 Nov. 13, 2014

Related U.S. Application Data

(60) Provisional application No. 61/794,950, filed on Mar. 15, 2013.

(51) Int. Cl.
| | |
|---|---|
| *H04N 19/85* | (2014.01) |
| *G01S 17/42* | (2006.01) |
| *G01S 17/89* | (2006.01) |
| *G01S 7/497* | (2006.01) |
| *G06K 9/00* | (2006.01) |

(52) U.S. Cl.
CPC ............ *H04N 19/85* (2014.11); *G01S 7/4972* (2013.01); *G01S 17/42* (2013.01); *G01S 17/89* (2013.01); *G06K 9/00201* (2013.01)

(58) Field of Classification Search
CPC ......... H04N 19/85; G01S 17/42; G01S 17/89; G01S 7/4972

USPC .................................................. 375/240.26
See application file for complete search history.

(56) References Cited

U.S. PATENT DOCUMENTS

| | | | |
|---|---|---|---|
| 5,988,862 A | 11/1999 | Kacyra et al. | |
| 6,420,698 B1* | 7/2002 | Dimsdale | G01S 7/4811 250/205 |
| 6,847,462 B1* | 1/2005 | Kacyra | G01B 11/002 250/234 |
| 7,643,135 B1 | 1/2010 | Walsh | |
| 7,701,558 B2 | 4/2010 | Walsh et al. | |
| 8,831,366 B1* | 9/2014 | Hickman | G06T 9/001 382/232 |

(Continued)

OTHER PUBLICATIONS

Martin A. Fischler and Robert C. Bolles, "Random Sample Consensus: A Paradigm for MOdel Fitting with Applications to Image Analysis and Automated Cartography", SRI International, 1981, p. 381-395.*

(Continued)

*Primary Examiner* — Nguyen Truong
(74) *Attorney, Agent, or Firm* — Maschoff Brennan

(57) ABSTRACT

A model-based scan line encoder is disclosed. A method of model-based scan line encoding includes defining a geometry model for describing a scan line of a scan, the scan line including multiple scan points. The method further includes calculating a trajectory model representing an approximate pattern of deviation of the multiple scan points relative to the geometry model. The method further includes calculating multiple residuals, each of the residuals associated with a difference between the deviation of the scan points and the trajectory model. The method may further include compressing the residuals.

20 Claims, 14 Drawing Sheets

(56) References Cited

U.S. PATENT DOCUMENTS

| | | | | |
|---|---|---|---|---|
| 2010/0166327 A1* | 7/2010 | Goel | ................... | H04N 19/105 |
| | | | | 382/236 |
| 2014/0098094 A1* | 4/2014 | Neumann | ............... | G06T 17/10 |
| | | | | 345/420 |
| 2014/0192050 A1* | 7/2014 | Qiu | ................... | G06K 9/00214 |
| | | | | 345/420 |
| 2014/0313064 A1* | 10/2014 | Shibata | ............... | H03M 7/3059 |
| | | | | 341/87 |

OTHER PUBLICATIONS

International Search Report and Written Opinion dated Dec. 3, 2014 as received in Application No. PCT/IB2014/001675.

\* cited by examiner

MODEL-BASED SCAN LINE ENCODER

CROSS-REFERENCE TO RELATED APPLICATIONS

This application claims priority to U.S. Provisional Application No. 61/794,950, filed Mar. 15, 2013, titled MODEL BASED SCAN LINE ENCODER, which is incorporated herein by reference in its entirety.

BACKGROUND

Field

The embodiments disclosed herein relate to compression and retrieval of three-dimensional (3-D) laser scan data.

Relevant Technology

Scanning devices for capturing 3-D reality using laser imaging, detection, and ranging (LIDAR) techniques such as those described in U.S. Pat. No. 7,701,558 and U.S. Pat. No. 5,988,862 have been growing in popularity and usage. Generally, the laser scanners may include some form of LIDAR that generates one or more range samples of one or more target surfaces. The LIDAR may also generate ancillary data associated with the samples, such as a measure of the return intensity of the laser, described as "active color" and/or the color of the sampled surface described as "passive color." Intensity may refer to the light returned from the surface from the laser, which may include several distinct wavelengths. Color may refer to light passively returned from a surface, which may be composed of one or more distinct bands of interest as with hyper spectral and/or thermal imaging.

The LIDAR may be mechanically positioned by the laser scanner to sample a region of interest over time. The mechanical positioning of the LIDAR is described as scanning. The positioning process may determine an origin and direction of the LIDAR sample. Together with the range(s), the origin and the direction may be employed to generate sample point(s) in a base coordinate system. Each sample point, together with its ancillary data such as return intensity and/or color, may be described as a scan point. A collection of scan points may be described as a scan. The scan may include scan lines, each of which may include a collection of scan points collected during a single mechanical motion or sweep.

Several examples of mechanical positioning exist. On a typical terrestrial survey LIDAR, such as a Leica ScanStation C10, the mechanical positioning of the LIDAR may be achieved by vertically deflecting a field of view of the LIDAR with a vertical deflector and horizontally rotating the vertical deflector together with the LIDAR. In this way, a scanning field of view generally resembling a sphere may be achieved. In some airborne LIDAR systems, such as the Leica ALS70, the LIDAR may be deflected across a flight path by a deflector. The deflector and the LIDAR may be mounted to an aircraft. Similarly, in some ground-vehicle-based LIDAR systems, the LIDAR may be deflected about an environment as the vehicle moves along a path. A targeting wedge prism scanner may form a LIDAR field of view by passing a laser beam through two round wedge prisms, one rotating at a much slower speed than the second, thus creating a spiral LIDAR sampling path.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

The embodiments disclosed herein relate to compression and retrieval of three-dimensional (3-D) laser scan data.

A method of model-based scan line encoding includes defining a geometry model for describing a scan line of a scan, the scan line including multiple scan points. The method further includes calculating a trajectory model representing an approximate pattern of deviation of the multiple scan points relative to the geometry model. The method further includes calculating multiple residuals, each of the residuals associated with a difference between the deviation of the scan points and the trajectory model. The method may further include compressing the residuals.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF EMBODIMENTS

The embodiments disclosed herein relate to compression and retrieval of three-dimensional (3-D) laser scan data. In typical scanning laser imaging, detection, and ranging (LIDAR) devices, the action of the LIDAR may be many times faster than the mechanical positioning, as the range and ancillary measurement data sources are electronic and optical in nature. The position and orientation components of a scan line may vary slowly and may closely follow a low dimensional model. The type of model followed by the scan line may be known in advance.

A model-based scan line encoder is disclosed. The scan line encoder may separate mechanically-driven and electro-optically-driven components of a scan line. The scan line encoder may further define a geometry model to describe the scan line relative to the mechanically-driven components. Scan points of the scan line may be compared to the geometry model and deviations between the scan points and the geometry model may be determined. A trajectory model may be calculated to represent an approximate pattern of the deviations of the scan points relative to the geometry model. Residuals may be calculated to represent the differences between the deviations and the trajectory model. The residuals may be compressed. The compressed residuals may be stored along with the geometry model and the trajectory model. Transforming the data using this model may enable effective lossless and lossy compression techniques. Furthermore, data loss may be matched to native error sources of scanning devices. In some embodiments, an index may allow particular scan data to be quickly located without the need to uncompress the entire data set.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale.

Figure 1:
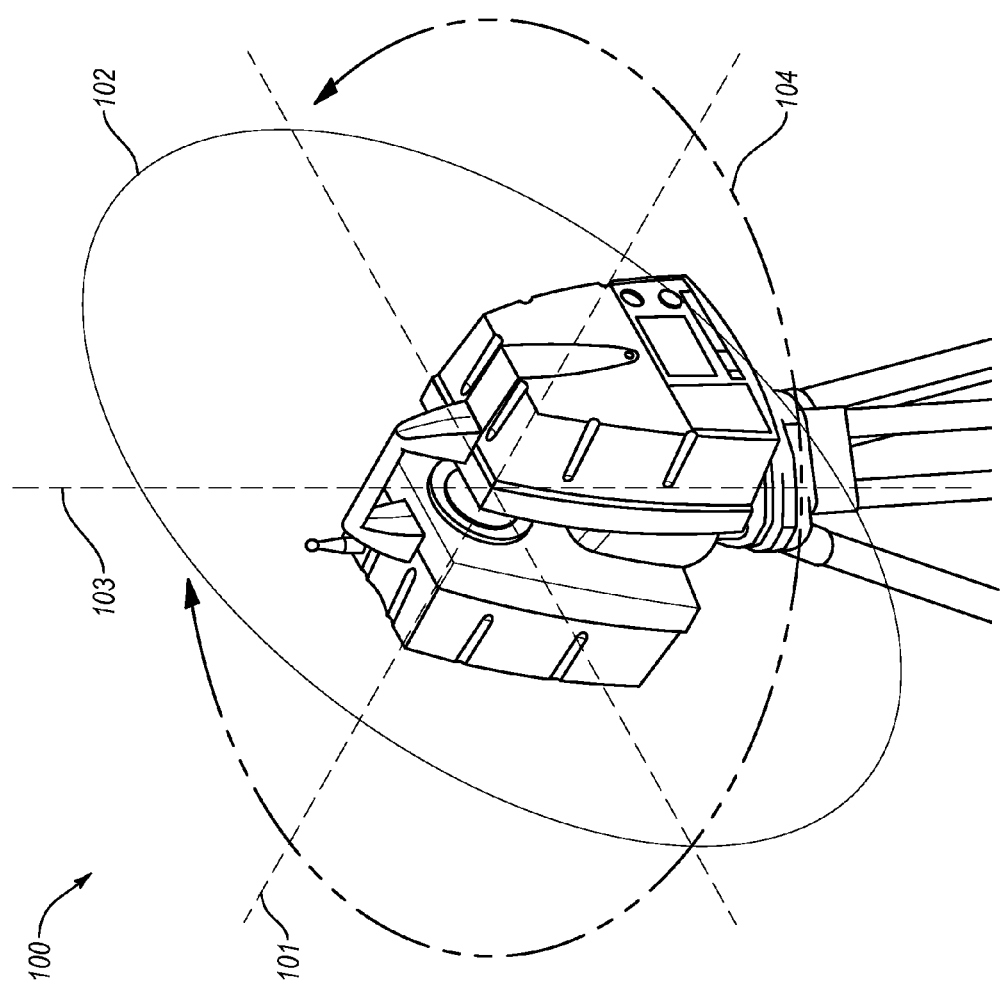
FIG. 1 is a perspective view of an example terrestrial laser scanner including a diagrammatic view of the kinematic behavior of the scanner.

FIG. 1 is a perspective view of an example terrestrial laser scanner 100 including a diagrammatic view of the kinematic behavior of the scanner 100. The scanner 100 may be configured to mechanically sweep a laser beam over a 3-D reality by rapidly rotating the laser beam about an approximately horizontal axis 101 and rotating the scanner 100 and/or the laser about an approximately vertical axis 103 incrementally and/or slowly relative to the rotation of the laser beam about the approximately horizontal axis 101. The angular position of the laser beam about the approximately horizontal axis 101 may be generally associated with an elevation 102 of the laser beam. The angular position of the laser beam about the approximately vertical axis 103 may be generally associated with an azimuth 104 of the laser beam.

Figure 2:
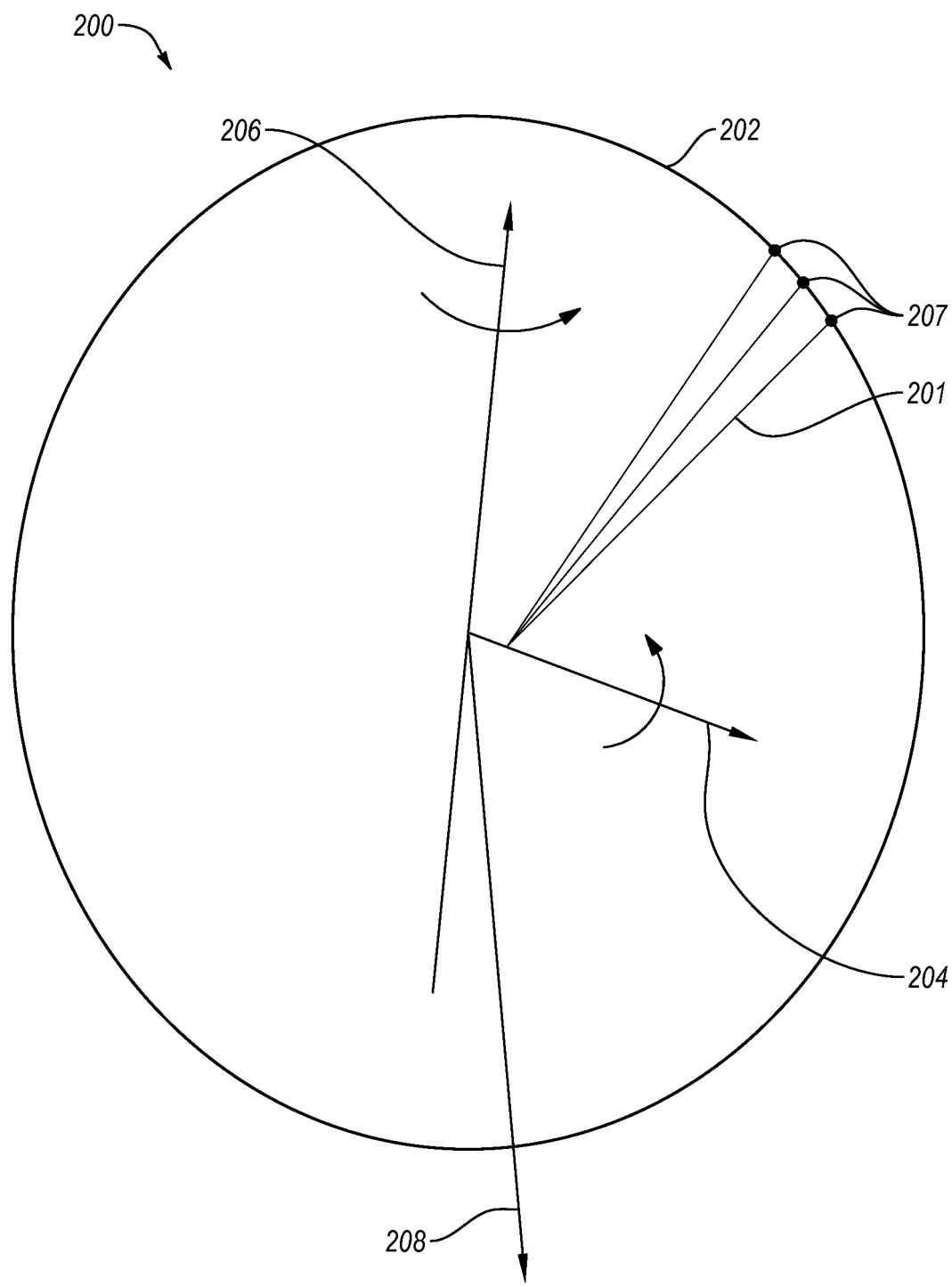
FIG. 2 is an abstract view of example kinematics of the scanner of FIG. 1.

FIG. 2 is an abstract view of example kinematics 200 of the scanner 100 of FIG. 1. A laser beam 201 may quickly rotate about a fast rotation axis 204. The fast rotation axis 204 may generally correspond to the approximately horizontal axis 101 of FIG. 1. As the laser beam 201 rotates, data samples described herein as scan points 207 may be taken at fixed time intervals. The scan points 207 associated with a complete or partial revolution of the fast rotation axis 204 are described herein as a scan line 202. Although shown on a shared curve, the scan points 207 may be associated with various ranges associated with sampled distances from the origin of the laser beam 201.

The laser beam 201 may rotate about a slow rotation axis 206 less quickly than the laser beam 201 rotates about the fast rotation axis 204. The slow rotation axis 206 may generally correspond to the approximately vertical axis 103 of FIG. 1. The slow rotation axis 206 may be nearly aligned with gravity 208, and the fast rotation axis 204 may be nearly perpendicular to gravity 208 and/or to the slow rotation axis 206.

The combination of the laser beam 201 rotating about the fast rotation axis 204 and the slow rotation axis 206 may allow scan points 207 to be gathered for a 3-D reality such as a room, an environment, or the like.

In some embodiments, the data collected at the scan points 207 may be associated with azimuth and elevation coordinates relative to the scanner. The azimuth axis may be aligned with gravity 208 and the elevation axis may be perpendicular to gravity 208. Alternately, the azimuth axis and the elevation axis may be associated with some other physical element of the environment and/or an associated scanner. The azimuth and elevation coordinates may be angular coordinates generally corresponding, respectively, to the elevation 102 and the azimuth 104 of FIG. 1.

In a practical laser scanner, the apparent origin of the laser beam 201 may not correspond directly with the azimuth and elevation coordinates due to misalignments and/or offsets of the scanner, some of which may be described, for example, in relation to the description of scanner calibration techniques in U.S. Pat. No. 7,643,135. For example, the fast rotation axis 204 and the slow rotation axis 206 may not be perfectly perpendicular. Furthermore, the origin of the laser beam 201 may not be related to any of the fundamental physical elements of the scanner kinematics 200 due to misalignments and/or offsets of the scanner. For example, the slow rotation axis 206 may not be perfectly in line with the direction of gravity 208, and/or the fast rotation axis 204 may not be perfectly perpendicular to the direction of gravity 208.

The misalignments and offsets of the scanner may not be provided by the scanner or by the manufacturer of the scanner. Furthermore, the misalignments and offsets may vary between scanners due to manufacturing tolerances, as well as potentially significant variances in the configuration and manufacturing processes of the scanners. Rather than providing the misalignments and offsets, scanners may instead provide measurement data that accounts for misalignments and offsets via naïve encoding.

The naïve encoding techniques of the scanner are often inefficient. For example, naïve encoding techniques that convert the detected scan data directly to objectively ideal azimuth angles and elevation angles, e.g., to azimuth angles and elevation angles associated with a fundamental physical element such as gravity 208, may be inefficient because the misalignments and offsets cause large deviations in the converted quantities. For example, overlapping scan lines located at a zenith, e.g., near the slow rotation axis 206 opposite the direction of gravity 208, of a scan may not intersect as a result of the misalignments and offsets, as disclosed in FIG. 3.

Figure 3:
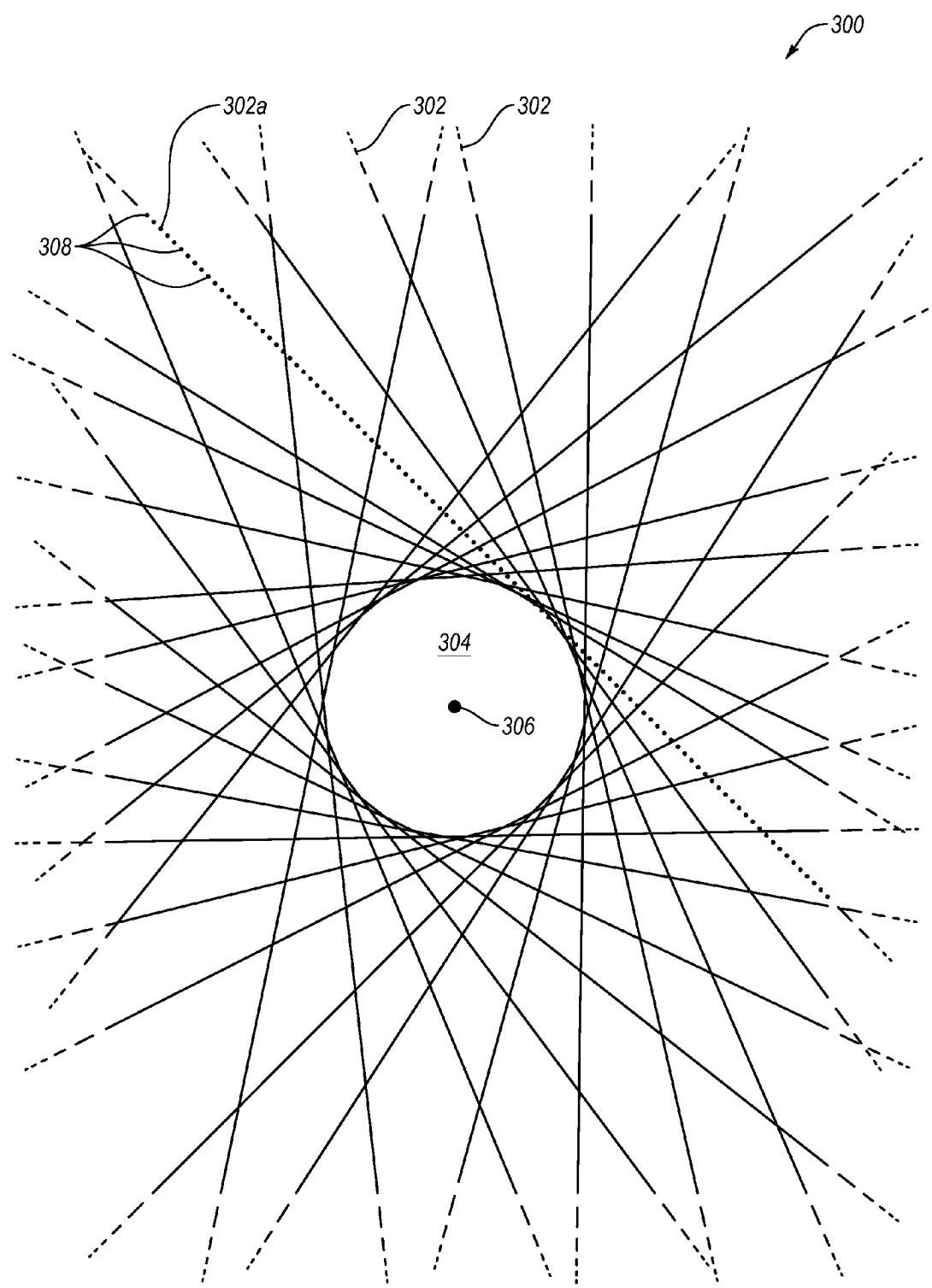
FIG. 3 is a diagrammatic view of an example scanning artifact that may be produced by the scanner of FIG. 1.

FIG. 3 is a diagrammatic view of an example scanning artifact 300 that may be produced by the scanner 100 of FIG. 1. In some instances, the artifact 300 may occur on a surface intersecting a slow rotation axis 306, which may generally correspond to the slow rotation axis 206 of FIG. 2. The multiple scan lines 302 may generally correspond to the scan line 202 of FIG. 2 taken at multiple locations about the slow rotation axis 206. Each scan line may include multiple scan points 308, which are shown only on one scan line 302a for clarity.

In some instances, the scan lines 302 may form a void 304 due to internal manufacturing misalignments, offsets, or the like. For example, the void 304 may be formed when the fast rotation axis 204 is not perfectly perpendicular to the slow rotation axis 306. Artifacts such as the artifact 300 may give rise to inefficiencies in naïve encoding techniques.

Figure 4:
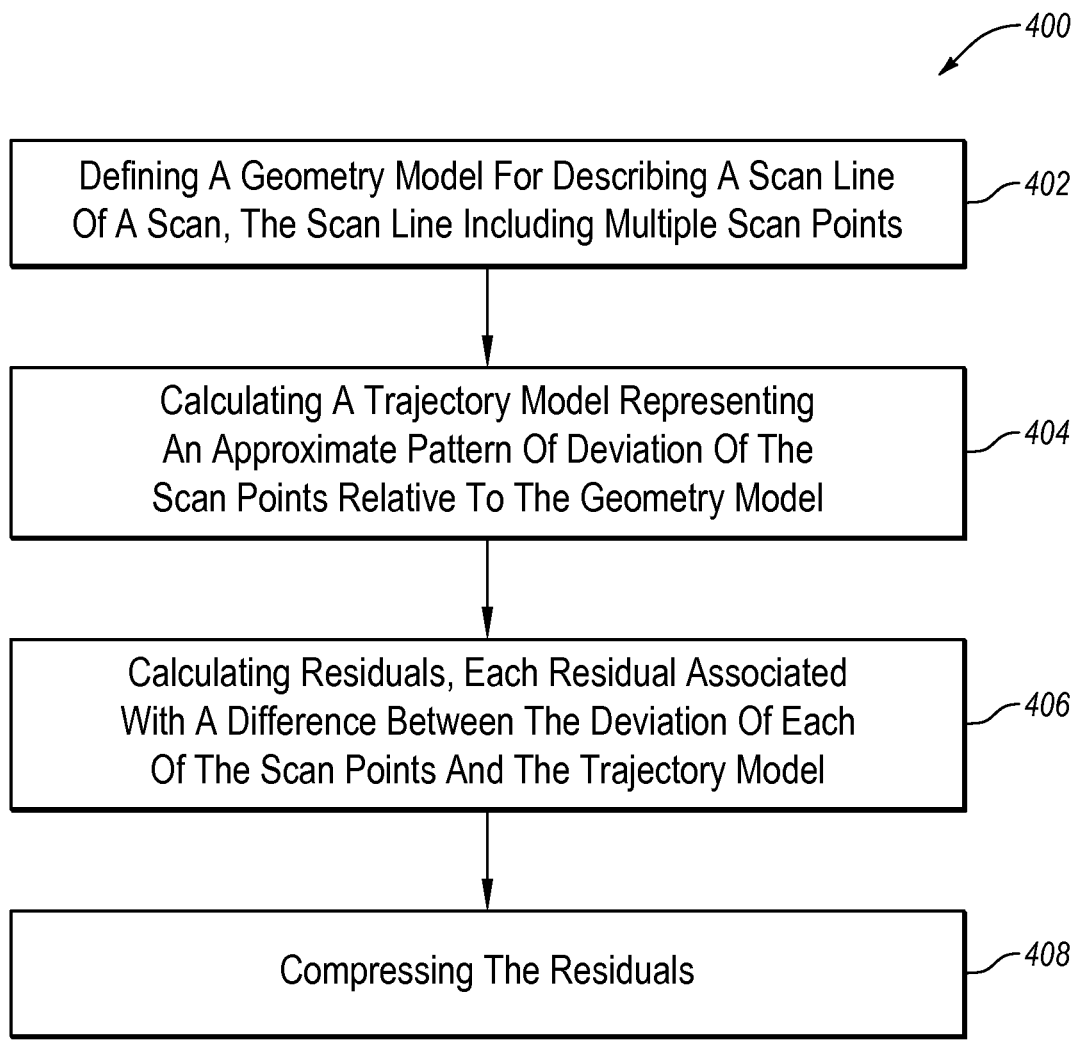
FIG. 4 is a flowchart of an example method of model-based scan line encoding that may be performed by the scanner of FIG. 1.

In some embodiments, model-based scan line encoding may be employed. In some instances, the model-based scan line encoding may provide efficient encoding of scan data. FIG. 4 is a flowchart of an example method 400 of model-based scan line encoding that may be performed by the scanner 100 of FIG. 1. The method 400 is described with continued reference to FIG. 2.

The method 400 may begin at block 402, defining a geometry model for describing a scan line 202 of a scan, the scan line may include multiple scan points 207. For example, the scan line 202 may lie roughly in a plane and/or roughly in a surface of an open cone. The geometry model may include a plane, a cone, a cylinder, a sphere, or the like or any combination thereof. The scan points 207 of the scan line 202 may not be described perfectly by the defined geometry model due to misalignments and/or offsets of the scanner 100, or the like. For example, the scan points 207 may deviate from a plane, a surface of an open cone, and/or the like of the defined geometry model.

Figure 5:
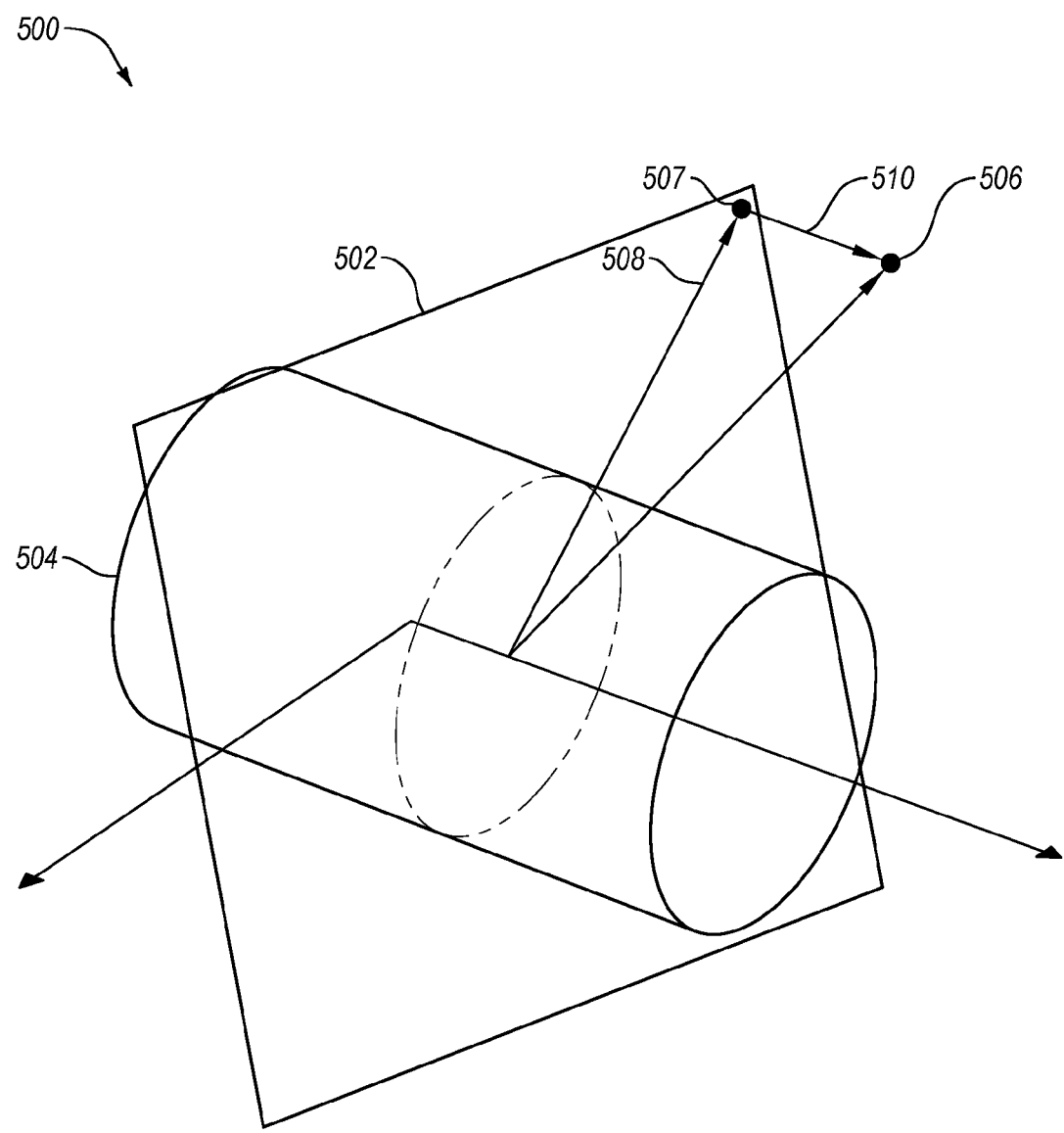
FIG. 5 is a diagrammatic view of an example geometric model, which may be employed by the scanner of FIG. 1, and/or by the method of FIG. 4.

FIG. 5 is a diagrammatic view of an example geometric model 500, which may be employed by the scanner 100 of FIG. 1, and/or by the method 400 of FIG. 4. With continued reference to FIG. 2, the geometric model 500 may include a plane 502 defined relative to the scan line 202.

Given a defined plane 502, each of the scan points 207 may be defined relative to the plane 502. Scan point 506 may generally correspond to the scan points 207. Scan point 506 may have, in the plane 502, a corresponding projected point 507 having a range 508 and an angle. Each scan point 506 may also include a deviation 510 normal to the plane 502.

In some embodiments, the deviation 510 may be divided by the range 508 to derive an angular error that may be considered conceptually as moving the deviation 510 to a unit cylinder 504 oriented perpendicular to the plane 502. Alternately or additionally, each scan point 506 may be converted to some other coordinates and/or some other geometric model 500. For example, the deviation 510 may be moved to a unit sphere (not shown) or the like.

Figure 6:
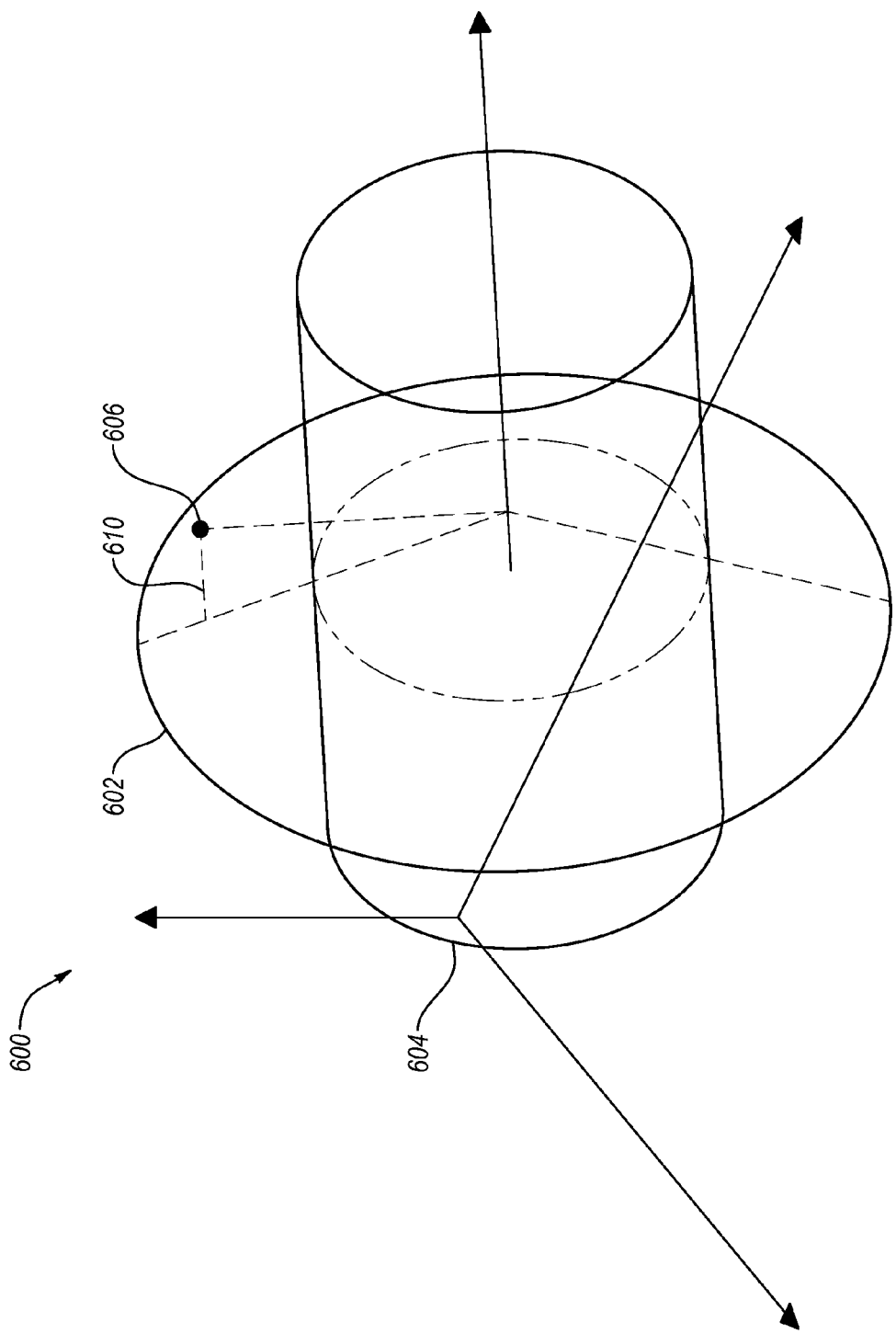
FIG. 6 is a diagrammatic view of another example geometric model that may be employed by the scanner of FIG. 1, and/or by the method of FIG. 4.

FIG. 6 is a diagrammatic view of another example geometric model 600 that may be employed by the scanner 100 of FIG. 1, and/or by the method 400 of FIG. 4. With continued reference to FIG. 2, the geometric model 600 may include a cone 602 defined relative to the scan line 202. The geometric model 600 may generally correspond to the geometric model 500 of FIG. 5, with a deviation 610 of a scan point 606 being taken from a surface defined by the cone 602 in a manner generally corresponding to the deviation 510 of FIG. 5. The deviation 610 may optionally be kept on a unit cylinder 604 as described with reference to FIG. 5. In some instances, the cone 602 may better model the geometry of the scan line 202 than the plane 502 as described with reference to FIG. 5.

Figure 7:
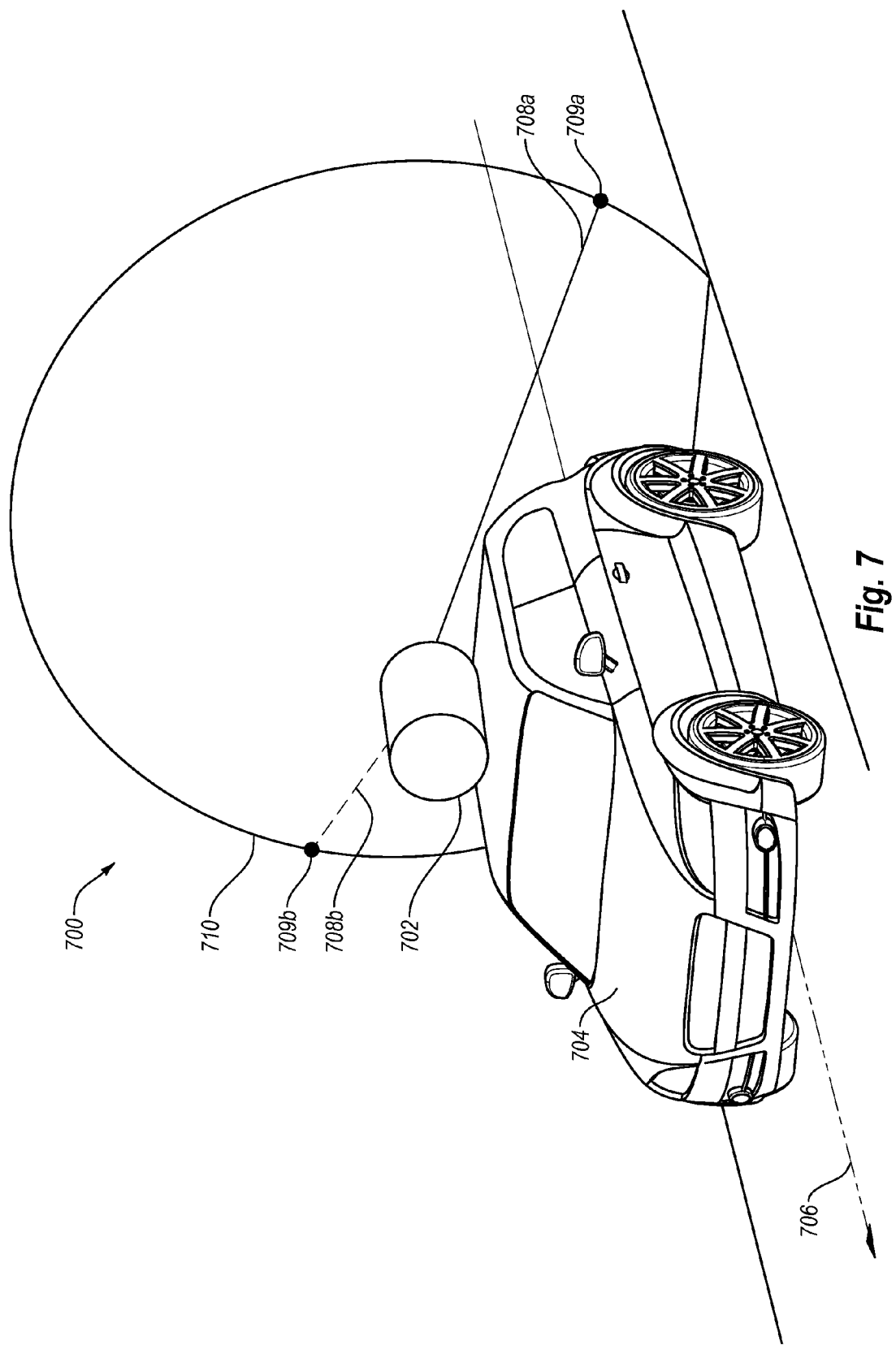
FIG. 7 is a perspective view of an example movable laser scanner.

FIG. 7 is a perspective view of an example movable laser scanner system 700. A laser scanner 702 may be attached to an automobile 704 or other vehicle configured to move the scanner, as represented by arrow 706. As the automobile 704 moves 706, the scanner 702 may use a laser beam 708 (shown in a first laser beam position 708a and a second laser beam position 708b) rotating about a fast rotation axis (not shown) to collect sample points 709 (shown as a first sample point 709a and a second sample point 709b) along a scan line 710 in a manner generally analogous to the scanner 100 of FIG. 1. Additional scanners (not shown) may be included on the automobile 704 to collect additional sample points (not shown).

As the automobile 704 moves 706, the scanner 702 moves with the automobile 704. In some instances, the laser beam 708 rotates about the fast rotation axis several orders of magnitude faster than the scanner 702 is displaced by the automobile 704 motion 706. In some embodiments, the displacement of the scanner 702 may be encoded in the geometric models of FIG. 5, FIG. 6, or the like. For example, the displacement of the scanner 702 between collecting sample points 709a and 709b may be encoded within the deviation 510 of FIG. 5 and/or the deviation 610 of FIG. 6 for the sample points 709a and 709b.

In some embodiments, an interpolated geometric model may be used. For example, an interpolated geometric model may be used when the laser beam 708 rotates about the fast rotation axis within several orders of magnitude faster than the scanner 702 is displaced by the automobile 704 motion 706.

Figure 8:
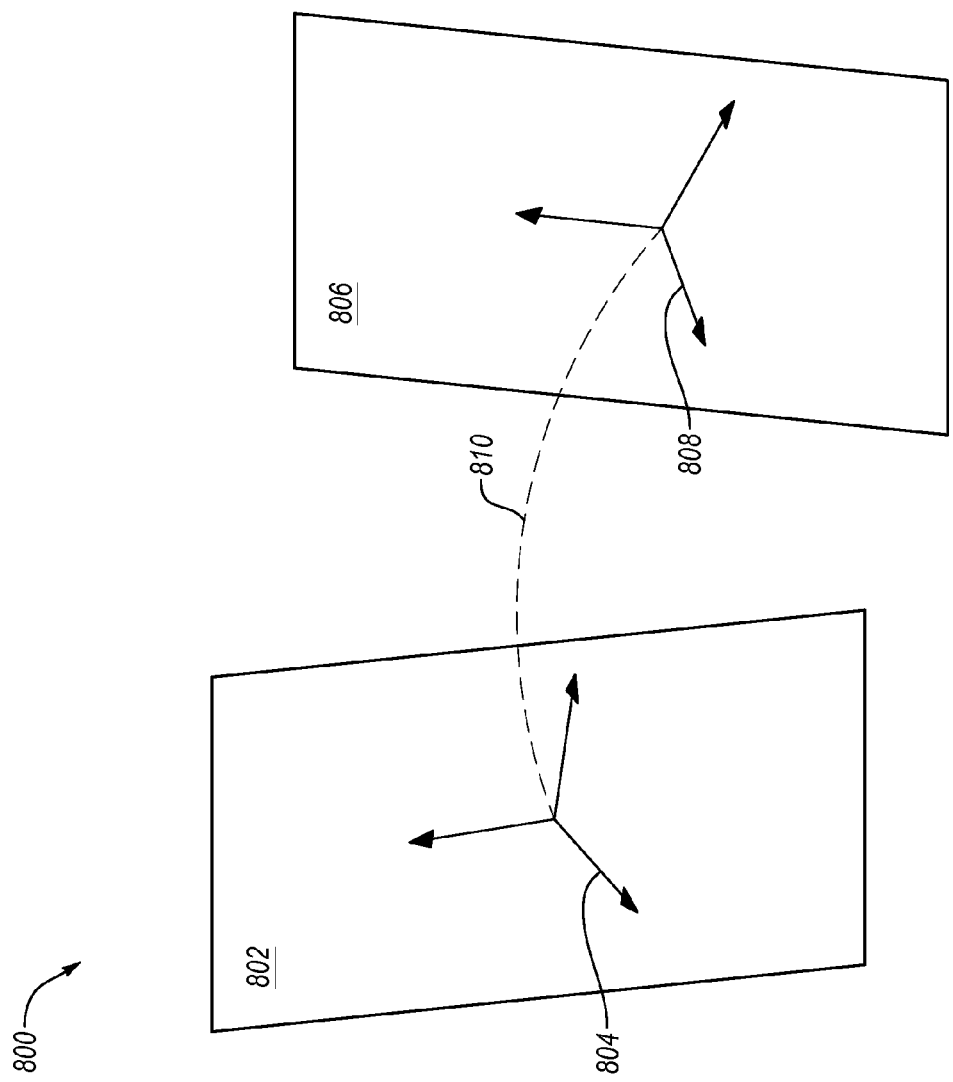
FIG. 8 is a diagrammatic view of an example interpolated geometric model that may be employed by the movable scanner of FIG. 7 and/or by the method of FIG. 4.

FIG. 8 is a diagrammatic view of an example interpolated geometric model 800 that may be employed by the movable scanner 702 of FIG. 7 and/or by the method 400 of FIG. 4. In some instances, the interpolated geometric model 800 may result in more efficient encoding of a scan line, such as the scan line 710 of FIG. 7. For example, the interpolated geometric model 800 may result in more efficient encoding of a scan line when the laser beam 708 rotates about the fast rotation axis at a speed within several orders of magnitude of the speed of the automobile 704 motion 706.

With continued reference to FIG. 7, the interpolated geometric model 800 may include a first plane 802 associated with a first frame 804. The first plane 802 may generally correspond to the plane 502 of FIG. 5. The first plane 802 and first frame 804 may generally be associated with a first laser beam position such as the first laser beam position 708a of FIG. 7.

The interpolated geometric model 800 may further include a second plane 806 associated with a second frame 808. The second plane 806 may be similar to the first plane 802, but the associated second frame 808 may have a different orientation and/or position relative to the first frame 804. The second plane 806 and second frame 808 may be associated with a second laser beam position such as the second laser beam position 708b of FIG. 7. The second plane 806 may differ from the first plane 802 based at least in part on a displacement of a scanner between the first laser beam position 708a and the second laser beam position 708b. The displacement may result from movement of a vehicle, such as the motion 706 of the automobile 704 of FIG. 7.

The interpolated geometric model 800 may further include an interpolated geometry 810 interpolated between the first plane 802 and the second plane 806. The interpolated geometry 810 may be interpolated for each scan point of a scan line, such as the scan points of the scan line 710 of FIG. 7. In some embodiments, the interpolated geometry 810 may include interpolated planes (not shown) associated with interpolated frames (not shown). In some embodiments, the first plane 802, the second plane 806, and the interpolated geometry 810 may be based on angles associated with the multiple scan points of a scan line 710.

Other geometry may be used with and/or in place of planes. For example, a cone (not shown) generally corresponding to the cone 610 of FIG. 6, a unit cylinder (not shown) generally corresponding to the unit cylinder 504 of FIG. 5, and/or a unit sphere (not shown) may be used with and/or in place of the first plane 802, the second plane 806, and/or the interpolated geometry 810.

Referring again to FIG. 4, in some embodiments, defining a geometry model as in block 402 may be based on a randomly selected subset of scan points. For example, a randomly selected subset of scan points may be used to determine whether a plane, a surface of an open cone, and/or the like should be used in the geometry model, as well as the coordinates for defining the geometry model. Alternately or additionally, the geometry model may be based on a random sample consensus (RANSAC) algorithm. Alternately or additionally, the geometry model may be based on calibration data of an associated laser scanner.

With reference to FIGS. 4 and 5, the method 400 may continue at block 404, calculating a trajectory model representing an approximate pattern of deviation 510 of the scan points 506 relative to the geometry model 500. For example, the trajectory model may represent an approximate pattern by which the scan points 506 deviate from a plane, a surface of an open cone, and/or the like. In some embodiments, the trajectory model may include a third-order polynomial. Alternately, the trajectory model may include another mathematic formula or the like.

Figure 9:
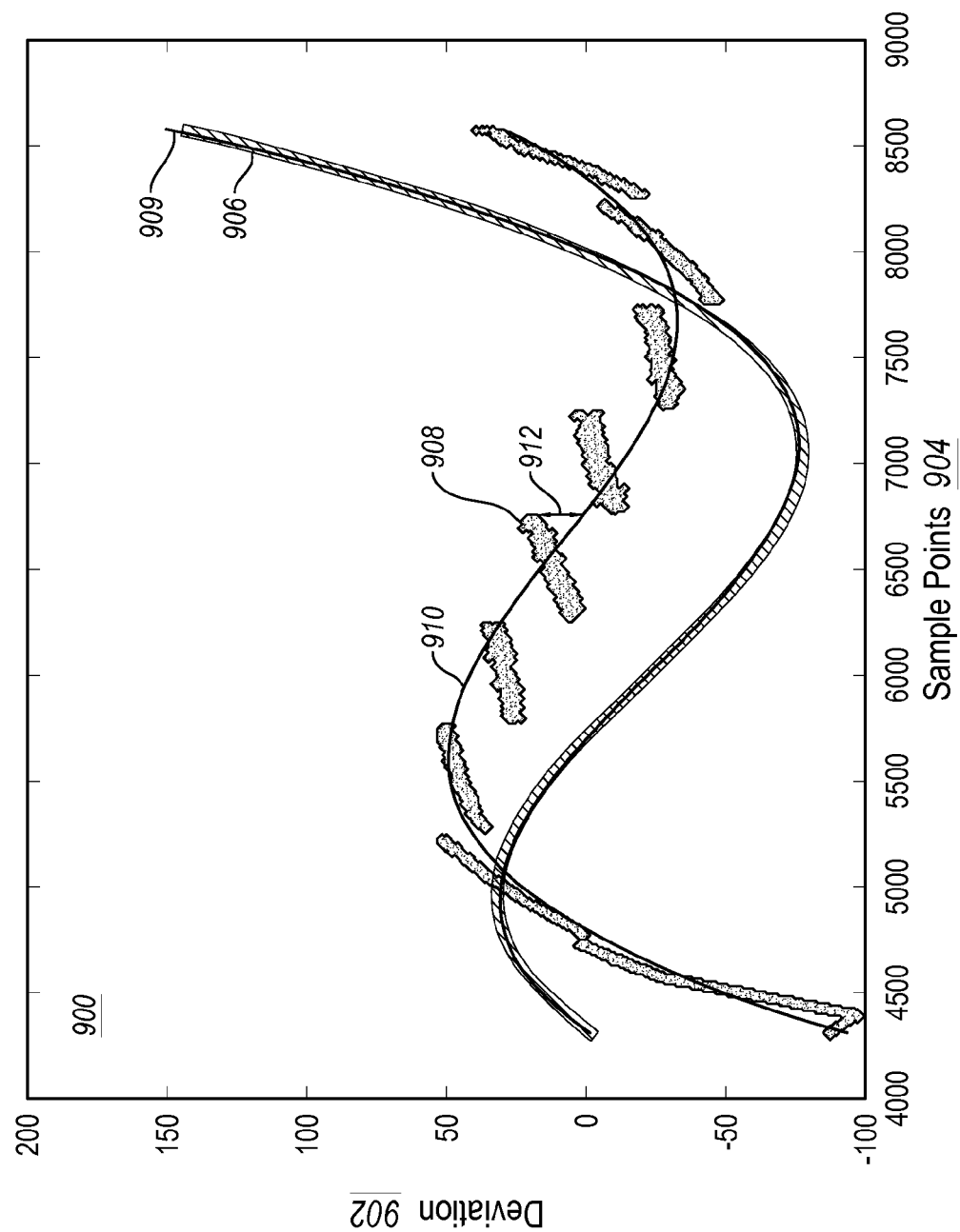
FIG. 9 illustrates a graph of deviation of sample points arranged by row index with overlaid trajectory models.

FIG. 9 illustrates a graph 900 of a deviation 902 of sample points 904 from a geometric model. The sample points are arranged by row index with overlaid trajectory models ("elevation trajectory model 909" and "azimuth trajectory model 910"). The graph 900 illustrates sample point 904 deviation in the elevation coordinate ("elevation deviation 906") and sample point 904 deviation 902 in the azimuth coordinate ("azimuth deviation 908"). In some embodiments, the deviation 902 may be measured in micro-radians (uR). In some instances, jagged azimuth deviation 908, such as seen in FIG. 9 may result from the motorization technology used in a particular scanner. The azimuth trajectory model 910 may be calculated to represent an approximate pattern of the azimuth deviation 908. The elevation trajectory model 909 may be similarly calculated to represent an approximate pattern of the elevation deviation 906.

Although the elevation deviation 906 and the azimuth deviation 908 are shown, more or fewer deviation coordinates and/or trajectory models 909 and 910 may alternately or additionally be used. For example, a single deviation coordinate (not shown) defined relative to a geometry model such as the geometry models 500, 600, and 700 of FIGS. 5, 6, and 7, respectively, may be used. Furthermore, a single trajectory model (not shown) may be calculated to represent the deviation 902 based on the single deviation coordinate.

Referring again to FIG. 4, with continued reference to FIG. 9, the method 400 may continue at block 406, calculating residuals associated with a difference between the deviation of the scan points and the trajectory model. For example, residuals 912 of the azimuth deviation 908 and the azimuth trajectory model 910 may be calculated.

The method 400 may continue at block 408, compressing the residuals. For example, the residuals 912 between the azimuth deviation 908 and the azimuth trajectory model 910 may be compressed. The values of the residuals may be very small such that compression to a fraction of the scanner accuracy, which may be measured in arc-seconds (approximately 5 uR), may require only a few bits per scan point.

In some embodiments, the residuals may be delta encoded before compression. Alternately or additionally, the residuals may be encoded using eight-bit universal character set transformation format (UTF-8) encoding before compression. Alternately or additionally, the residuals may be run length encoded before compression.

The scan data may occupy a significantly reduced space in a memory and/or a storage. Furthermore, the scan data may include little to no loss in accuracy compared to conventional naïve encoding techniques. In some embodiments, the compressed scan data may be approximately ¼, ⅕, or ⅛ of the size of scan data compressed using conventional naïve encoding techniques.

Figure 10:
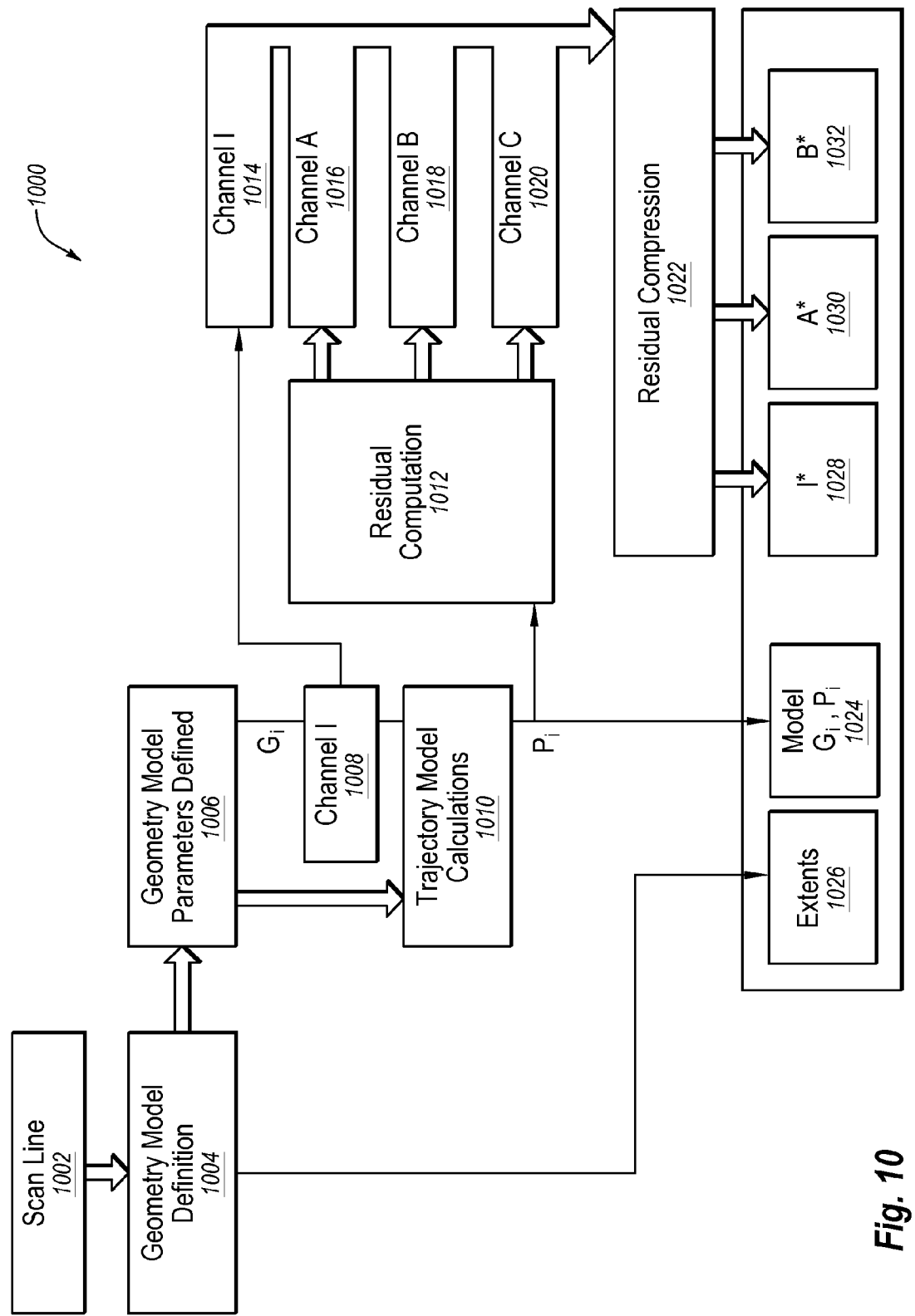
FIG. 10 is a flowchart of an example model-based compression process that may be performed by the scanner of FIG. 1.

FIG. 10 is a flowchart of an example model-based compression process 1000 that may be performed by the scanner 100 of FIG. 1. Given a collection of points in a scan line 1002, the process 1000 may be used to compress the scan line data.

In block 1004, a geometry model type may be defined. The geometry model type may be defined in advance. The geometry model type may alternately be defined based at least in part on the scan line 1002. In some embodiments, the scan line 1002 or a collection of scan lines may be fit to multiple geometry models and a best fit may be selected.

In block 1006, geometry model parameters may be defined. The geometry model parameters may describe a geometric model on which the LIDAR scanner was pointed. For example, the scan lines may be fit to a plane cone, cylinder, sphere, or the like or any combination thereof, and points in space may be in polar coordinates off of the geometry model.

In blocks 1008 and 1010, the scan points of the scan line 1002 may be projected to the geometric surface and a trajectory model transforming a point index (described herein as channel I 1008, or point number to row index) to trajectory coordinates on the geometry model may then be calculated. For example, the trajectory model may be a third-order polynomial or other low-order polynomial.

In block 1012, the residuals against the trajectory model from block 1010 may be computed for each point. Depending on the compression strategy, the point row index 1014 and/or the residuals 1016, 1018, and 1020 may be compressed at block 1022.

The geometry and/or trajectory models 1024 and the geometry model extents 1026 may be stored together with the compressed scan line components 1028, 1030, and 1032. Three channels (A, B, and C) are shown together with the row index (I), though more or fewer channels may be possible. Data fidelity (loss) in compression may be matched against each model and constant in each channel.

In some embodiments, more compression may be possible, where the geometry and/or trajectory models and the geometric model extents are predictable from scan line to scan line, potentially as the result of a slower time scale mechanical process. Compressing only the scan line components may allow for swift access to the point data as the model and extents for each scan line is available. To search for points in a volume, the models and extents may be searched first. If a scan line contains relevant points, the residuals may be uncompressed. In some embodiments, only those residuals related to the searched-for points need be uncompressed, in contrast to uncompressing all of the residuals.

Figure 11:
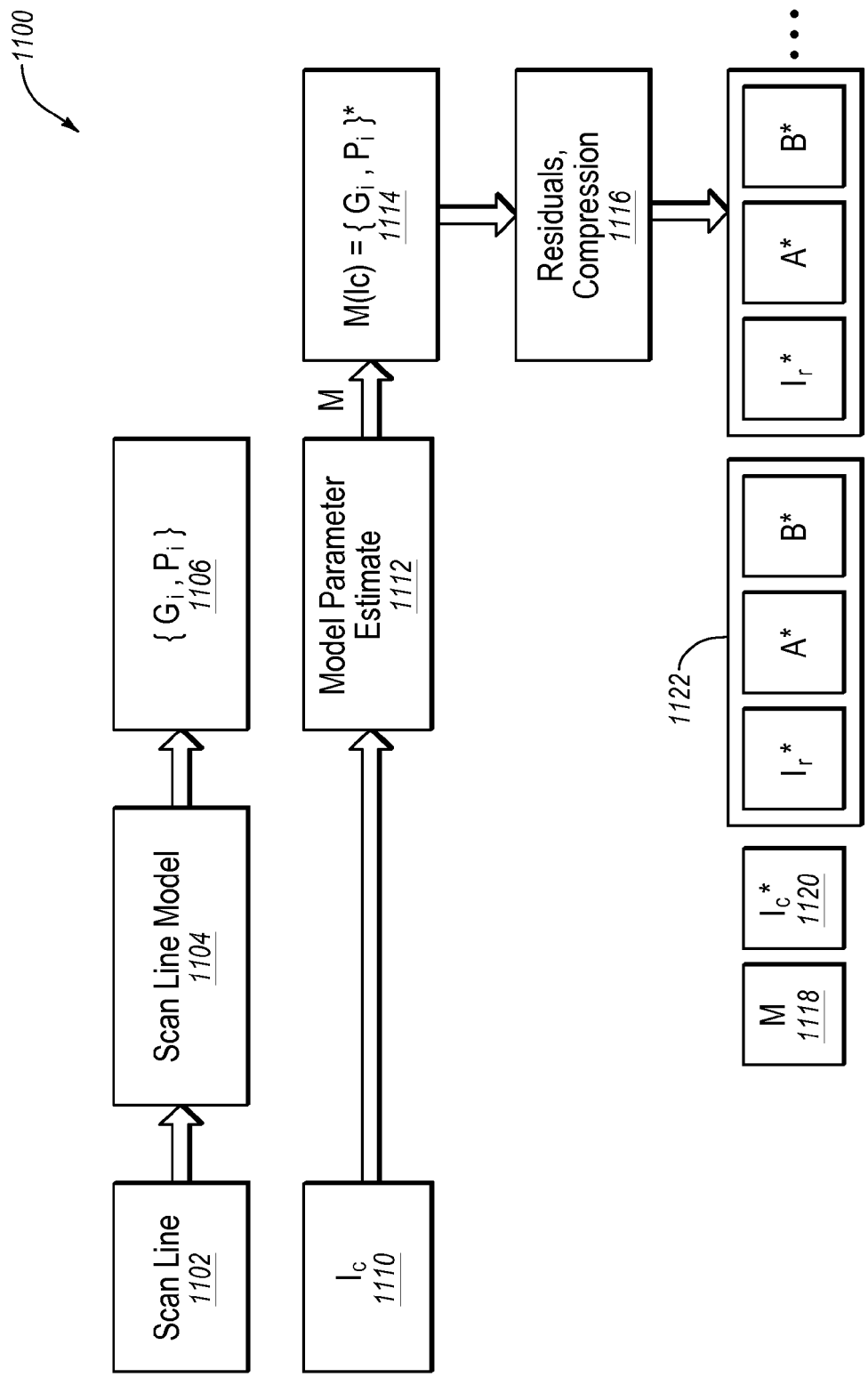
FIG. 11 is a flowchart of another example compression process that may be performed by the scanner of FIG. 1.

FIG. 11 is a flowchart of another example compression process 1100 that may be performed by the scanner 100 of FIG. 1. The process 1100 may be described as a geometry model column index model. In some embodiments, creating or estimating the geometric model parameters does not have to be done for each scan line or stored with each scan line 1102. Instead, a model for a geometric (G) model may be estimated from row index. Optionally, a parametric (P) model may also be estimated from the row index. The parametric model may generally correspond to the trajectory model described with reference to FIG. 4.

The geometric model may be a slowly varying function of the column index and may be estimated with all scan line models or with a subset of scan line models. The scan line compression may be done with column-index-generated geometry instead of computing a scan line by scan line geometric model.

Figure 12:
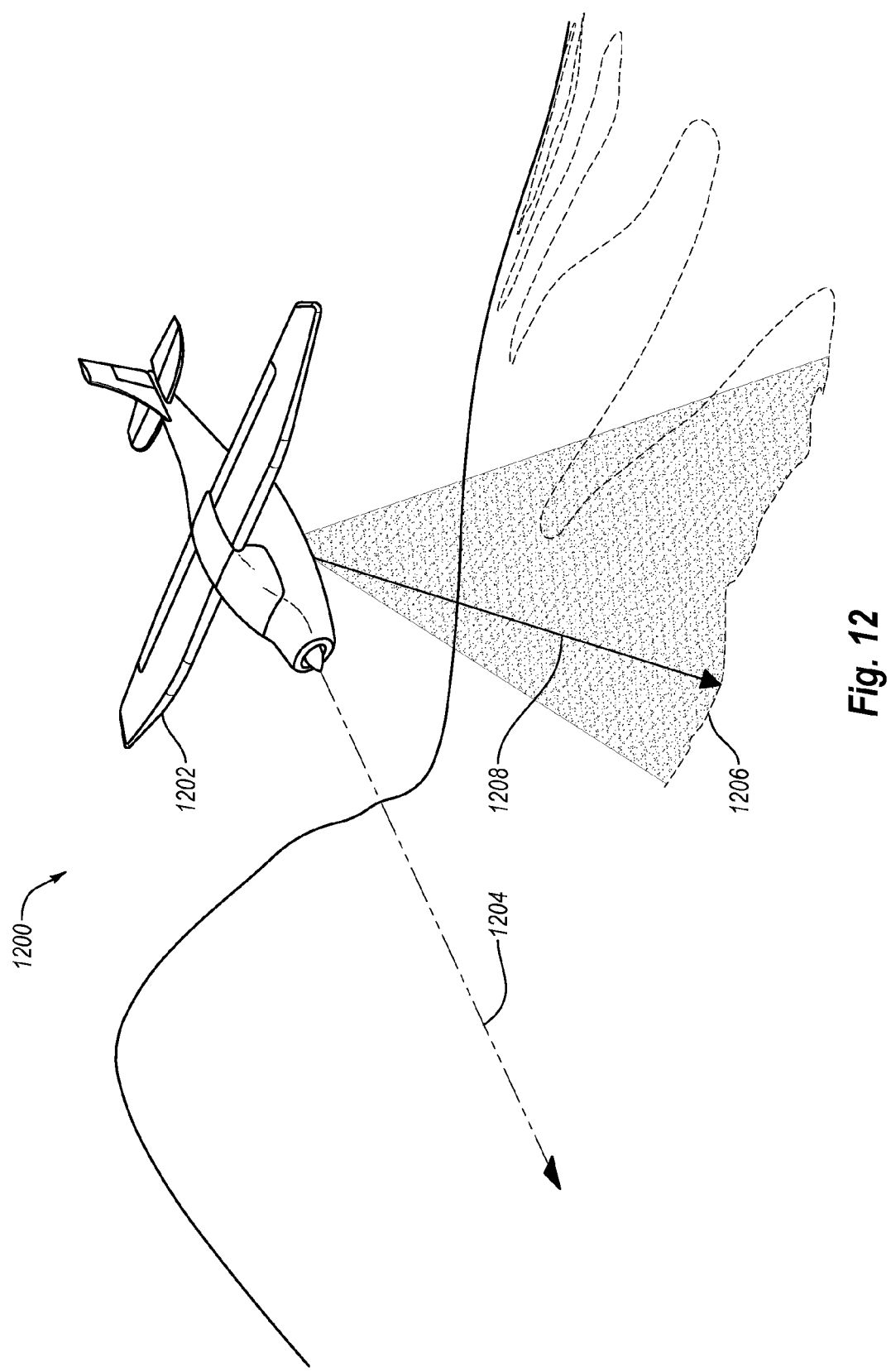
FIG. 12 is a perspective view of an example airborne laser scanner.

FIG. 12 is a perspective view of an example airborne laser scanner 1200. The airborne laser scanner 1200 for surveying may sweep a laser beam 1208 rapidly across a flight path 1204. Scan data may be divided into scan lines 1206. The airborne laser scanner 1200 may include an aircraft 1202 carrying a sweeping laser beam 1208, such as a LIDAR. The time scale of the aircraft 1202 flight path 1204 versus the time scale of the laser beam 1208 motion may allow for each scan line to be modeled by a geometric model similar to the geometric models described herein. A plane or cone may be inferred from a single scan line 506 of point data, the center from the flight path 1204, and/or from a laser (LAS) file format stored deflection angle.

The geometric model may be fit to the scan line data set collected by the airborne laser scanner 1200. In some embodiments, the time for each point may be given for LAS format greater than 1.1 as global positioning system (GPS) time. The center of the cylinder is the aircraft 1202 position may potentially be inferred at encoding time. The aircraft 1202 position may be inferred from a stored angle and refined if multiple return points are available. Without multiple return points, points at the edges of the scan lines 1206 may be found and the distance/height to the aircraft 1202 center may be inferred from the stored angle. In instances including multiple return points, the multiple return points may lay on the same line, and the intersection of different multiple returns may be used to determine the approximate center of the aircraft 1202. A map of row indices may be encoded, as there may be multiple returns.

Figure 13:
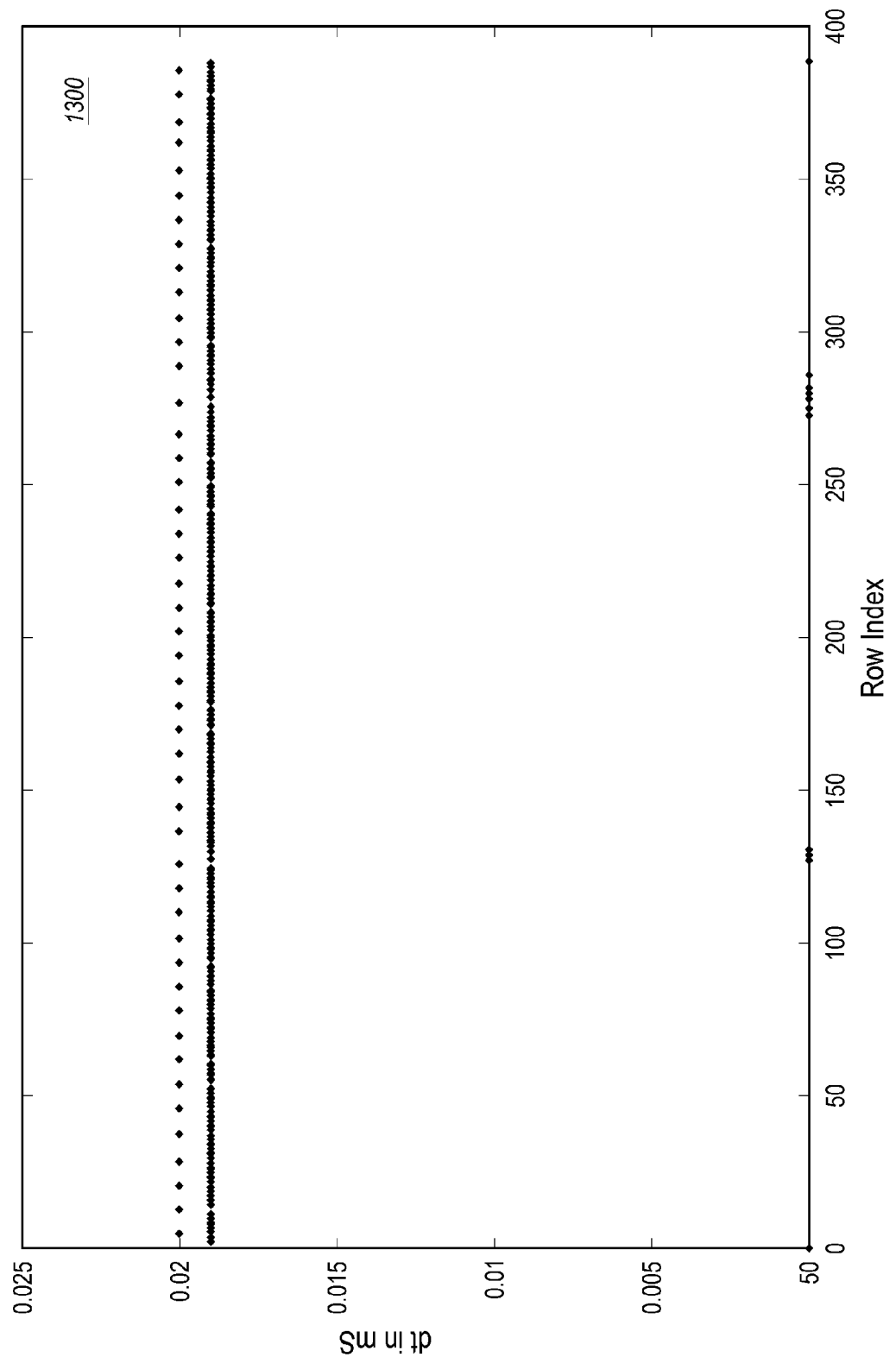
FIG. 13 is a graph of example delta-times that may be associated with a scan line of data that may be collected by the airborne laser scanner of FIG. 12.

FIG. 13 is a graph 1300 of example delta-times that may be associated with a scan line of data that may be collected by the airborne laser scanner 1200 of FIG. 12. Encoding a GPS time stamp (row index, Ir) for a scan line may be compact, as most points may have one of three values of delta-times. The delta-times with a value of zero may be multiple returns.

Figure 14:
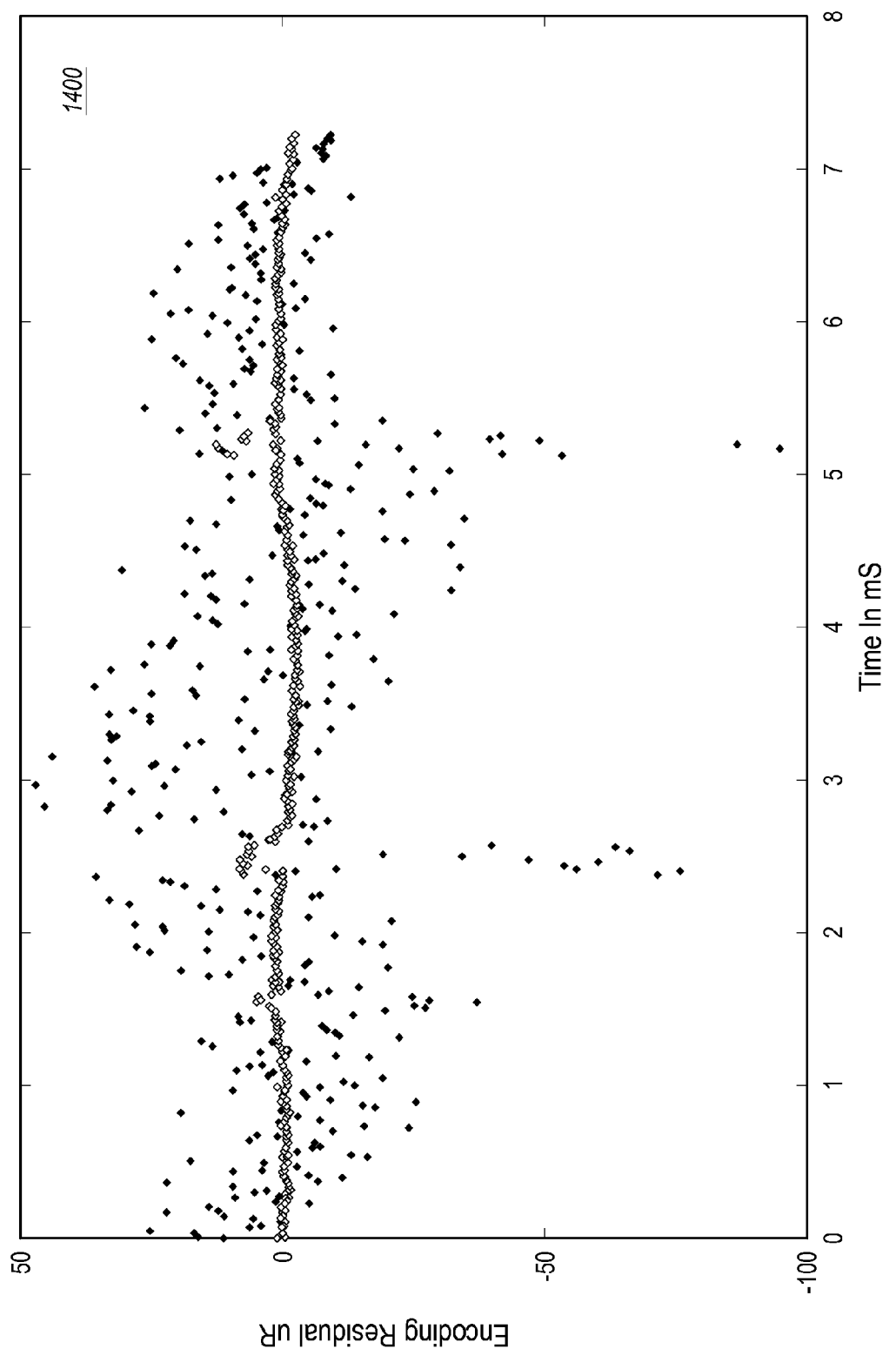
FIG. 14 is a graph of example modeled scan data of elevation (sweep) and azimuth encoding along a single scan line of airborne laser scanner data.

FIG. 14 is a graph of example modeled scan data 1400 of elevation (sweep) and azimuth encoding along a single scan line 1206 of airborne laser scanner 1200 data. Encoded residuals may be much smaller than the size of the laser beam 1208, as 50 uR may correspond approximately to 4 cm on the ground.

In FIGS. 13 and 14, the aircraft 1202 center is approximately eight hundred (800) meters in height and the LIDAR mirror is a four-parameter oscillating drive model instead of a cubic. A spinning polygon may fit with a cubic similar to a terrestrial laser scanner. The low parameter model and the residual compression technique may be chosen as appropriate.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of model-based scan line encoding, the method comprising:

defining a geometry model for describing a scan line of a scan, the scan line including a plurality of scan points collected during a mechanical sweep of a laser scanner, wherein the geometry model describes the scan line relative to mechanically-driven components of the laser scanner, and the scan points deviate relative to the geometry model as a result of misalignments or offsets of the laser scanner;

calculating a trajectory model representing an approximate pattern of the deviation of the plurality of scan points collected during the mechanical sweep of the laser scanner relative to the geometry model resulting from the misalignments or offsets of the laser scanner;

calculating a plurality of residuals, wherein each of the plurality of residuals represents a difference between each collected scan point of the plurality of scan points collected during the mechanical sweep of the laser scanner and the trajectory model representing the approximate pattern of the deviation of the plurality of scan points relative to the geometry model; and compressing the plurality of residuals.

2. The method of claim 1, further comprising:
storing the geometry model;
storing the trajectory model; and
storing the plurality of residuals.

3. The method of claim 1, wherein defining the geometry model is based at least in part on a randomly selected subset of the plurality of scan points collected during the mechanical sweep of the laser scanner.

4. The method of claim 1, wherein defining the geometry model is based at least in part on a random sample consensus (RANSAC) algorithm.

5. The method of claim 1, wherein defining the geometry model is based at least in part on calibration data of a scanner.

6. The method of claim 1, wherein the scan further includes a plurality of scan lines including the scan line, the method further comprising generating a scan index of the plurality of scan lines based at least in part on the geometric model and the trajectory model, the scan index configured to locate a desired subset of scan points of the plurality of scan points collected during the mechanical sweep of the laser scanner.

7. The method of claim 1, wherein the scan further includes a plurality of scan lines including the scan line, the method further comprising generating a scan index of the plurality of scan lines based at least in part on a low order fit model for the geometric model and the trajectory model, the scan index configured to locate a desired subset of scan points of the plurality of scan points collected during the mechanical sweep of the laser scanner.

8. The method of claim 1, further comprising dividing each collected scan point of the plurality of scan points collected during the mechanical sweep of the laser scanner by a range component of each of the plurality of scan points.

9. The method of claim 1, wherein the geometry model includes a plane.

10. The method of claim 1, wherein the geometry model includes a cone.

11. The method of claim 1, wherein the geometry model includes a cylinder.

12. The method of claim 1, wherein the geometry model includes a sphere.

13. The method of claim 1, wherein the trajectory model includes a third-order polynomial.

14. The method of claim 1, wherein the geometry model includes a plurality of geometries, each of the plurality of geometries associated with an individual scan point of the plurality of scan points collected during the mechanical sweep of the laser scanner, each of the pluralities of geometries based at least in part on the associated individual scan point.

15. The method of claim 1, wherein the geometry model includes:
a first geometry associated with a first scan point of the plurality of scan line scan points;
a second geometry associated with a second scan point of the plurality of scan line scan points; and
an interpolated geometry interpolated between the first geometry and the second geometry as a function of one or more scan line scan points of the plurality of scan line scan points.

16. The method of claim 15, wherein:
the first geometry is based at least in part on a first angle associated with the first scan point;
the second geometry is based at least in part on a second angle associated with the second scan point; and
the interpolated geometry is based at least in part on one or more angles associated with the one or more scan line points.

17. The method of claim 1, wherein the plurality of residuals are delta encoded before compression.

18. The method of claim 1, wherein the plurality of residuals are encoded using eight-bit universal character set transformation format (UTF-8) encoding before compression.

19. The method of claim 1, wherein the plurality of residuals are run length encoded before compression.

20. A laser scanner configured to perform operations comprising:
defining a geometry model for describing a scan line of a scan, the scan line including a plurality of scan points collected during a mechanical sweep of a laser scanner, wherein the geometry model describes the scan line relative to mechanically-driven components of the laser scanner, and the scan points deviate relative to the geometry model as a result of misalignments or offsets of the laser scanner;

calculating a trajectory model representing an approximate pattern of the deviation of the plurality of scan points collected during the mechanical sweep of the laser scanner relative to the geometry model resulting from the misalignments or offsets of the laser scanner;

calculating a plurality of residuals, wherein each of the plurality of residuals represents a difference between each collected scan point of the plurality of scan points collected during the mechanical sweep of the laser scanner and the trajectory model representing the approximate pattern of the deviation of the plurality of scan points relative to the geometry model; and compressing the plurality of residuals.

* * * * *